United States Patent
Aoyama

(10) Patent No.: US 9,426,248 B2
(45) Date of Patent: Aug. 23, 2016

(54) DATA COLLECTION AND TRANSFER APPARATUS

(71) Applicant: Naoyuki Aoyama, Tokyo (JP)

(72) Inventor: Naoyuki Aoyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/439,141

(22) PCT Filed: Nov. 22, 2012

(86) PCT No.: PCT/JP2012/080346
§ 371 (c)(1),
(2) Date: Apr. 28, 2015

(87) PCT Pub. No.: WO2014/080495
PCT Pub. Date: May 30, 2014

(65) Prior Publication Data
US 2015/0296042 A1    Oct. 15, 2015

(51) Int. Cl.
*G06F 15/167* (2006.01)
*H04L 29/08* (2006.01)
(Continued)

(52) U.S. Cl.
CPC ............ *H04L 67/2842* (2013.01); *H04L 13/08* (2013.01); *H04L 67/1097* (2013.01); *H04L 69/40* (2013.01)

(58) Field of Classification Search
CPC ............ H04L 67/1097; H04L 67/2842; H04L 12/2602; H04L 12/2419; H04L 41/0654; H04L 69/40; H04L 13/08
USPC .................. 709/217, 219, 224, 212, 213, 232; 711/113
See application file for complete search history.

(56) References Cited

U.S. PATENT DOCUMENTS

| 2005/0193225 A1* | 9/2005 | Macbeth | G06F 11/0709 714/2 |
| 2007/0011488 A1* | 1/2007 | Orii | G06F 11/349 714/5.11 |

(Continued)

FOREIGN PATENT DOCUMENTS

| CN | 202431441 U | 9/2012 |
| EP | 1420317 A2 | 5/2004 |

(Continued)

OTHER PUBLICATIONS

Examination Report for corresponding Taiwan Patent Application No. 1021099988 dated Jan. 9, 2015.

(Continued)

*Primary Examiner* — Frantz Jean
(74) *Attorney, Agent, or Firm* — Sughrue Mion, PLLC

(57) ABSTRACT

A data collection and transfer apparatus includes: a memory; a buffer having large capacity and low data storage speed; a collecting unit collecting data and storing it in the memory; a transferring unit transferring data stored in the memory to a server; a monitoring unit monitoring a network; and a setting unit retaining storages. When fault is not detected, the collecting unit collects data specified in collection-data-setting storage with period specified in collection-period-setting storage and stores it in the memory and the transferring unit transfers data stored in the memory to the server with period specified in transfer-period-setting storage, and when fault is detected, the collecting unit collects data specified in buffer-data-setting storage with period specified in buffer-period-setting storage and stores it in the memory and data stored in the memory is stored in the buffer with period specified in the buffer-period-setting storage.

5 Claims, 2 Drawing Sheets

(51) Int. Cl.
*H04L 29/14* (2006.01)
*H04L 13/08* (2006.01)

(56) References Cited

U.S. PATENT DOCUMENTS

| | | | |
|---|---|---|---|
| 2009/0038010 A1 | | 2/2009 | Ma et al. |
| 2012/0084400 A1* | | 4/2012 | Almadi ................ H04L 41/069 709/219 |
| 2013/0290773 A1* | | 10/2013 | Yoshihara ........... G06F 11/1412 714/6.21 |

FOREIGN PATENT DOCUMENTS

| | | |
|---|---|---|
| JP | 01-098086 A | 4/1989 |
| JP | 07-210214 A | 8/1995 |
| JP | 07-219898 A | 8/1995 |
| JP | 09-282280 A | 10/1997 |
| JP | 2001-195123 A | 7/2001 |
| JP | 2004-199670 A | 7/2004 |
| JP | 2006-164182 A | 6/2006 |
| JP | 2010-218013 A | 9/2009 |
| JP | 2010-109832 A | 5/2010 |
| KR | 10-2006-0059040 A | 6/2006 |
| TW | 201235861 A | 9/2012 |
| TW | 201245915 A | 11/2012 |
| WO | 2010/109584 A1 | 9/2010 |
| WO | 2012111109 A1 | 8/2012 |

OTHER PUBLICATIONS

International Search Report for PCT/JP2012/080346 dated Jan. 15, 2013.
Communication dated Jul. 8, 2015 from the German Patent and Trademark Office issued in corresponding application No. 112012007061.5.
Communication dated Jan. 8, 2016 from the Korean Intellectual Property Office in counterpart application No. 10-2015-7012459.

* cited by examiner

DATA COLLECTION AND TRANSFER APPARATUS

CROSS REFERENCE TO RELATED APPLICATIONS

This application is a National Stage of International Application No. PCT/JP2012/080346 filed Nov. 22, 2012, the contents of all of which are incorporated herein by reference in their entirety.

FIELD

The present invention relates to a data collection and transfer apparatus that collects control data (input/output data and internal data) related to a control device and transfers the control data to a personal computer for monitoring and analyzing (hereinafter, referred to as an upper-level server) for the operating state of the control device and the state of the control target to be monitored and analyzed.

BACKGROUND

Data collection and transfer apparatuses have been used that collect control data related to a control device and transfer the control data to the upper-level server, connected via a LAN, for the operating state of the control device and the state of the control target to be remotely monitored and analyzed. Such data collection and transfer apparatuses temporarily store data collected from the control device in a memory device (hereinafter, a temporary memory) capable of reading and writing at high speed and then transfers the data to the upper-level server at a given time.

The data collection and transfer apparatus collects data related to the control device and stores the data in the temporary memory, and then transfers the data to the upper-level server at a given time. However, when a fault occurs in the network between the data collection and transfer apparatus and the upper-level server, the data stored in the temporary memory cannot be transferred to the upper-level server. Moreover, when the memory capacity of the temporary memory is not sufficiently large, not all the data related to the control device collected while a network fault is occurring can be stored. In other words, there is a problem in that it is impossible to monitor and analyze the operating state of the control device and the state of the control target while a network fault is occurring.

In order to solve such a problem, the following data collection and transfer apparatus has been proposed. The apparatus is configured from a control device that performs a predetermined control and retains data related to this control and a data collection and transfer apparatus that has a function of, after collecting control data related to the control device and storing the control data in the temporary memory, transferring the data stored in the temporary memory to the upper-level server at a given time and a means (hereinafter, referred to as buffering) for, when a fault is detected in the network between the data collection and transfer apparatus and the upper-level server, storing, in order, the data stored in the temporary memory in a memory that can store large-capacity data (hereinafter, referred to as a large-capacity buffer memory).

A method for taking a measure against a fault in a measured data collection system is proposed in Patent Literature 1. This measured data collection system has a mode switching unit that switches the personal computer terminal in the personal computer, which is connected via a line to the host computer system, from the online mode to the local mode when a fault occurs and switches the personal computer terminal from the local mode to the online mode when the fault is rectified and a measured-data continuous collection and storage unit that continuously collects online-mode measured data and local-mode measured data before and after the occurrence of a fault and stores the data in an external storing device in the personal computer.

CITATION LIST

Patent Literature

Patent Literature 1: Japanese Patent Application Laid-open No. H01-98086

SUMMARY

Technical Problem

However, due to the specifications of memories, the data storage speed of the large-capacity buffer memory is typically lower than the data storage speed of the temporary memory and thus not all the data stored in the temporary memory can be buffered. Therefore, when a network fault occurs, data cannot be buffered and the minimum amount of data required is lost in some cases. By using a memory having a large capacity and having a high data storage speed as a large-capacity buffer memory, it is possible to store all the data stored in the temporary memory in the large-capacity buffer memory; however, the memory having a large capacity and having a high data storage speed is generally expensive.

The present invention has been achieved in view of the above and an object of the present invention is to provide a data collection and transfer system capable of, when the data storage speed of a large-capacity buffer memory is lower than that of a temporary memory, storing the minimum amount of data required from the temporary memory in the large-capacity buffer memory when a network fault occurs.

Solution to Problem

In order to solve the above problems and achieve the object, the present invention relates to a data collection and transfer apparatus including: a temporary memory; a buffer memory that has a larger capacity than a capacity of the temporary memory and has a lower data storage speed than a data storage speed of the temporary memory; a data collecting unit that collects control data from a manufacturing apparatus and stores the control data in the temporary memory; a data transferring unit that transfers the control data stored in the temporary memory to an upper-level server; a network monitoring unit that monitors a network connecting the upper-level server and the data transferring unit; and a setting unit that retains a collection-data-setting storage, a collection-period-setting storage, a transfer-period-setting storage, a buffering-data-setting storage, and a buffering-period-setting storage, wherein when a fault is not detected in the network by the network monitoring unit, the data collecting unit collects the control data specified in the collection-data-setting storage with a period specified in the collection-period-setting storage and stores the control data in the temporary memory and the data transferring unit transfers the control data stored in the temporary memory to the upper-level server with a period specified in the transfer-period-setting storage, and when a fault is detected in the network by the network monitoring unit, the data collecting unit collects the control data specified in the buffering-data-setting storage with a period specified in the buffering-period-setting storage and stores the control data in the temporary memory and the control data stored in the temporary memory is stored in the buffer memory with a period specified in the buffering-period-setting storage.

Advantageous Effects of Invention

According to the data collection and transfer apparatus of the present invention, when a fault occurs in the network between the data collection and transfer apparatus and the upper-level server, i.e., when data cannot be transferred to the upper-level server, control data is stored in the large-capacity buffer memory in the data collection and transfer apparatus. Because different pieces of control data are collected with different collection periods when the network is normal and when a fault occurs, an effect is obtained where, even when the buffer rate is lower than the data transfer rate, the minimum amount of control data required can be prevented from being lost when a buffer operation is performed.

DESCRIPTION OF EMBODIMENTS

Exemplary embodiments of a data collection and transfer system in which a data collection and transfer apparatus according to the present invention is used will be explained below in detail with reference to the drawings. This invention is not limited to the embodiments.

Embodiment

Figure 1:
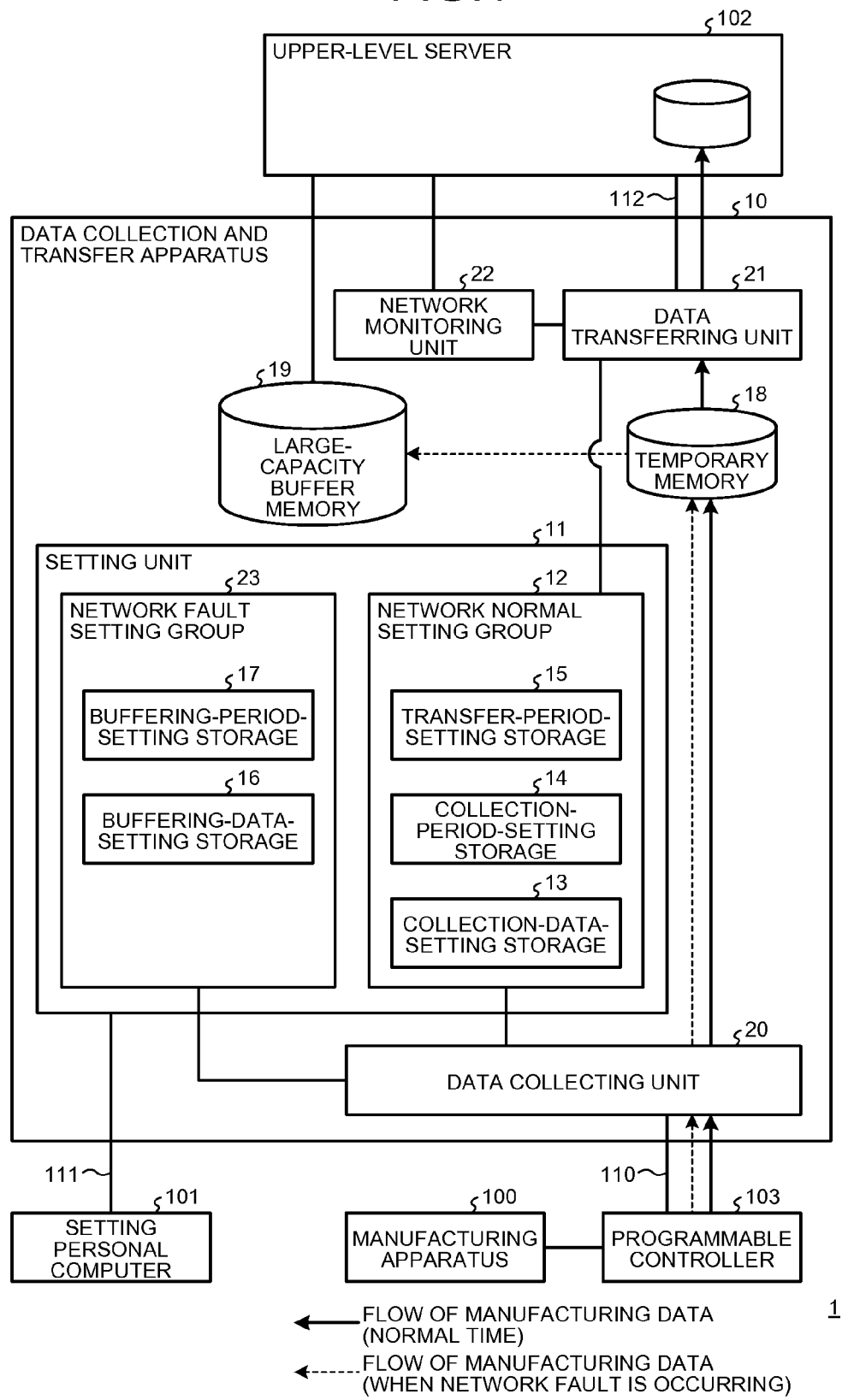
FIG. 1 is a diagram illustrating a schematic configuration of a data collection and transfer system according to an embodiment.

FIG. 1 is a diagram illustrating an example of the configuration of a data collection and transfer system 1 in which a data collection and transfer apparatus 10 according to an embodiment of the present invention is used. The solid line arrows in FIG. 1 indicate the flow of control data when a fault has not occurred in the network between the data collection and transfer apparatus 10 and an upper-level server 102. The broken line arrows indicate the flow of control data when a fault is occurring in the network. The control data here is, for example, input/output data and internal data related to a control device.

As illustrated in FIG. 1, the data collection and transfer apparatus 10 according to the present embodiment includes a data collecting unit 20 that is connected to a manufacturing apparatus 100 via a programmable controller 103, that collects control data from the programmable controller 103 that controls the manufacturing apparatus 100, and that stores the control data in a temporary memory 18; a data transferring unit 21 that transfers the control data stored in the temporary memory 18 to the upper-level server 102; a setting unit 11 that is connected to a setting personal computer 101 and retains the settings set in the setting personal computer 101; a network monitoring unit 22 that detects a fault in the network between the data collection and transfer apparatus 10 and the upper-level server 102; and a buffer unit that buffers the control data stored in the temporary memory 18 in a large-capacity buffer memory 19 when a network fault occurs. The large-capacity buffer memory 19 is a memory that has a larger capacity than that of the temporary memory 18 but has a lower data storage speed than that of the temporary memory 18. The programmable controller 103 and the data collection and transfer apparatus 10 are connected via an internal bus 110, the setting personal computer 101 and the data collection and transfer apparatus 10 are connected via an Ethernet (registered trademark) cable 111, and the data collection and transfer apparatus 10 and the upper-level server 102 are connected via an Ethernet (registered trademark) cable 112.

The programmable controller 103 is connected to the manufacturing apparatus 100 and controls the manufacturing apparatus 100. The data generated as a result of the control and the data that is referred to when the control is performed are control data. In the present embodiment, the control data is data to be collected. The data collection and transfer apparatus 10 connected to the programmable controller 103 collects control data and transfers the control data to the upper-level server 102. In the data collection and transfer system 1 illustrated in FIG. 1, the configuration is such that one manufacturing apparatus (the manufacturing apparatus 100) is connected to one programmable controller 103 connected to the data collection and transfer apparatus 10; however, in the data collection and transfer apparatus according to the embodiment of the present invention, the number of programmable controllers connected to the data collection and transfer apparatus and the number of manufacturing apparatuses connected to the programmable controller can be any number.

The network monitoring unit 22 monitors the presence or absence of the occurrence of a fault in the network between the data collection and transfer apparatus 10 and the data collecting unit 20.

The setting unit 11 retains setting data set by the user using the setting personal computer 101. The setting unit 11 includes a network normal setting group 12 and a network fault setting group 23.

During a period when the network monitoring unit 22 does not detect a network fault, the network normal setting group 12 is referred to by the data collecting unit 20 and the data transferring unit 21. During a period when the network monitoring unit 22 detects a network fault, the network fault setting group 23 is referred to by the data collecting unit 20.

The network normal setting group 12 includes a collection-data-setting storage 13 that stores the setting regarding which control data among the control data is to be collected by the data collecting unit 20; a collection-period-setting storage 14 that stores the setting of the period with which control data is collected by the data collecting unit 20; and a transfer-period-setting storage 15 that stores the setting of the period with which the control data collected in the temporary memory 18 is transferred to the upper-level server 102 by the data transferring unit 21.

The network fault setting group 23 includes a buffering-data-setting storage 16 that stores the setting regarding which control data among the control data is to be collected by the data collecting unit 20 and a buffering-period-setting storage 17 that stores the setting of the period with which control data is collected.

It is possible to set, using the setting personal computer 101, whether the control data that is stored in the large-capacity buffer memory 19 while a network fault is occurring, i.e., the control data that has not been transferred to the upper-level server 102, is transferred to the upper-level server 102 immediately after the network monitoring unit 22 detects network restoration or at a given time specified by the user, and store the setting in the setting unit 11.

During a period when the network monitoring unit 22 detects a network fault, control data is stored in the large-capacity buffer memory 19. The large-capacity buffer memory 19 is an external storage medium that has a storage area sufficient for storing control data and is detachably attached to the data collection and transfer apparatus 10. The large-capacity buffer memory 19 is, for example, a Compact Flash (registered trademark) card or an SD card.

Figure 2:
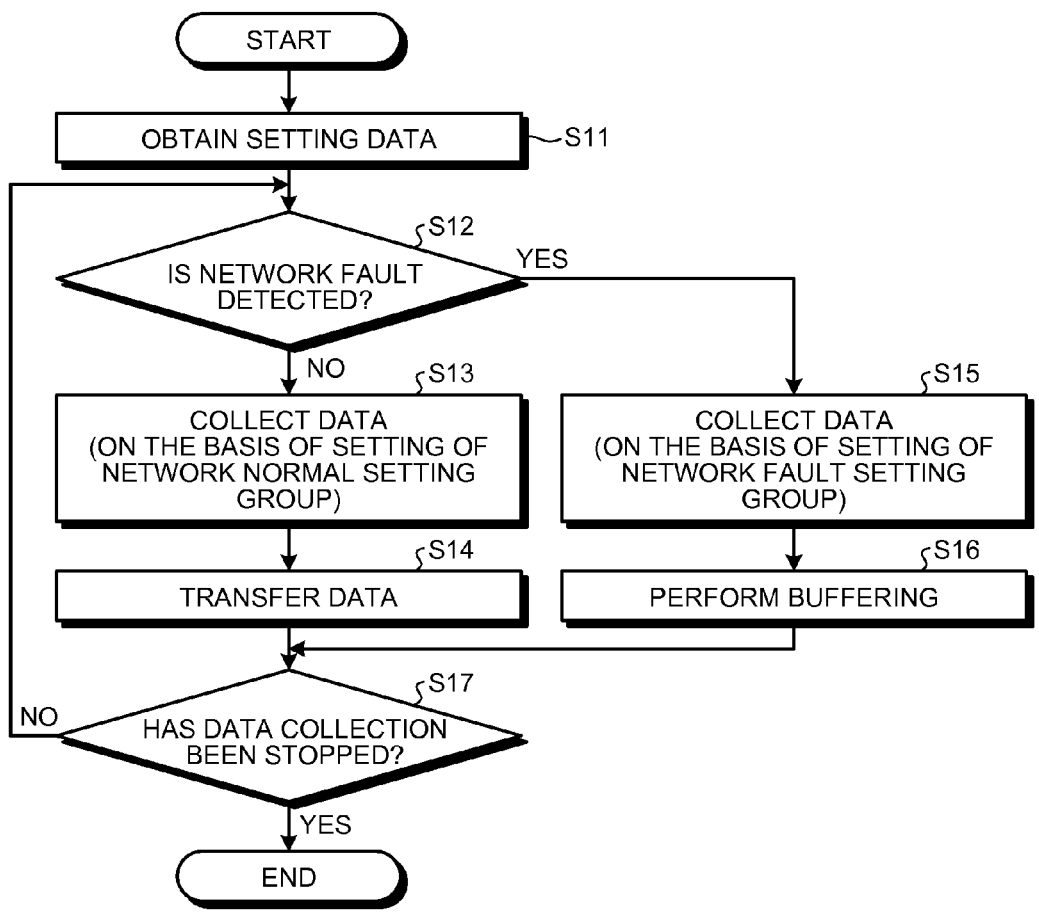
FIG. 2 is a diagram illustrating a flowchart explaining the flow of a series of processes performed by a data collection and transfer apparatus according to the embodiment.

Next, an explanation will be given, with reference to FIG. 2, of a series of flows from the collection of control data to the data transfer or the storing of the data in the large-capacity buffer memory 19 within the data collection and transfer apparatus 10 according to the present embodiment configured as above. FIG. 2 is a flowchart illustrating the outline of the process performed by the data collection and transfer apparatus 10 according to the present embodiment.

First, the setting unit 11 obtains setting data generated by the user using the setting personal computer 101 (Step S11). Next, whether the network monitoring unit 22 detects the occurrence of a network fault is checked (Step S12). When a network fault is not detected (No at Step S12), the data collecting unit 20 collects the control data specified in the collection-data-setting storage 13 of the network normal setting group 12 with a period specified in the collection-period-setting storage 14 (Step S13). The collected control data is stored in the temporary memory 18 and is transferred to the upper-level server 102 by the data transferring unit 21 on the basis of the period specified in the transfer-period-setting storage 15 (Step S14).

When a network fault is detected at Step S12 (Yes at Step S12), the data collecting unit 20 collects the data specified in the buffering-data-setting storage 16 of the network fault setting group 23 in the temporary memory 18 with a period specified in the buffering-period-setting storage 17 (Step S15). The collected data is stored in the large-capacity buffer memory 19 on the basis of the period specified in the buffering-period-setting storage 17 (Step S16). The processes from Step S12 to Step S16 are repeated (No at Step S17) until the data collection is stopped (Yes at Step S17).

Next, an explanation will be given of the settings of the network fault setting group 23. The buffering-data-setting storage 16 that specifies data to be buffered when a network fault is detected and the buffering-period-setting storage 17 that specifies a buffering period are respectively set independently from the collection-data-setting storage 13 and the collection-period-setting storage 14, which are settings when a network fault is not detected. The buffering-data-setting storage 16 and the buffering-period-setting storage 17 can be set to exactly the same values as the collection-data-setting storage 13 and the collection-period-setting storage 14, respectively; however, when the data storage speed of the large-capacity buffer memory 19 is low and not all the collected data can be stored in the large-capacity buffer memory 19, they can be set to different values. Whether all the collected data can be buffered can be determined using the setting personal computer 101.

Specifically, the setting personal computer 101 can automatically calculate the period with which data to be buffered is collected in accordance with the maximum storage speed with which data can be stored in the large-capacity buffer memory 19 and can set the calculated period in the buffering-period-setting storage 17. Moreover, the user can determine whether the data specified in the buffering-data-setting storage 16 can be collected with a period specified in the buffering-period-setting storage 17 on the basis of the data storage speed of the large-capacity buffer memory 19. The setting personal computer 101 has a function of notifying the user of the automatically set values and the determination result.

When it is determined that not all the collected data can be stored in the large-capacity buffer memory 19 if the buffering-data-setting storage 16 and the buffering-period-setting storage 17 are respectively set to the same values as the collection-data-setting storage 13 and the collection-period-setting storage 14, the following setting can be made. That is, it is possible to reduce the control data specified in the buffering-data-setting storage 16, i.e., data to be buffered, to be less than the control data specified in the collection-data-setting storage 13 in accordance with the degree of importance of the collection determined by the user. Alternatively, the period specified in the buffering-period-setting storage 17, i.e., the collection period with which data to be buffered is collected, may be set to be longer than the period specified in the collection-period-setting storage 14. Alternatively, both of the above processes may be performed. It is possible to prevent high-value data from being lost by setting the buffering-data-setting storage 16 and the buffering-period-setting storage 17 in such a manner.

In the present embodiment, after the network is restored, the data buffered in the large-capacity buffer memory 19 is transferred to the upper-level server 102 at a time specified by the user. The user can arbitrarily specify whether the buffered data is transferred to the upper-level server 102 immediately after the network is restored or at a time specified by the user.

Furthermore, the invention of the present application is not limited to the above embodiments and can be variously modified at the execution stage without departing from the scope thereof. Moreover, the above-described embodiments include inventions in various stages and various inventions can be extracted by appropriately combining a plurality of disclosed components. For example, even if some of the components are deleted from all the components illustrated in the embodiments, the configuration in which some components are deleted can be extracted as an invention as long as the problems described in the section of Technical Problem can be solved and the effects described in the section of Advantageous Effects of Invention can be obtained. Furthermore, the components in different embodiments may be appropriately combined.

INDUSTRIAL APPLICABILITY

As described above, the data collection and transfer apparatus according to the present invention is useful as a data collection and transfer apparatus that collects control data related to a control device and transfers the control data to the upper-level server for the operating state of the control device and the state of the control target to be monitored and analyzed and is particularly suitable as a data collection and transfer apparatus that monitors and analyzes the operating state of the control device and the state of the control target while a network fault is occurring.

REFERENCE SIGNS LIST

1 data collection and transfer system, 10 data collection and transfer apparatus, 11 setting unit, 12 network normal setting group, 13 collection-data-setting storage, 14 collection-period-setting storage, 15 transfer-period-setting storage, 16 buffering-data-setting storage, 17 buffering-period-setting storage, 18 temporary memory, 19 large-capacity buffer memory, 20 data collecting unit, 21 data transferring unit, 22 network monitoring unit, 23 network fault setting group, 100 manufacturing apparatus, 101 setting personal computer, 102 upper-level server, 103 programmable controller, 110 internal bus, 111, 112 Ethernet (registered trademark) cable.

The invention claimed is:

1. A data collection and transfer apparatus comprising:
   a temporary memory;
   a buffer memory that has a larger capacity than a capacity of the temporary memory and has a lower data storage speed than a data storage speed of the temporary memory;
   a data collector to collect control data from a manufacturing apparatus and store the control data in the temporary memory;
   a data transferor to transfer the control data stored in the temporary memory to an upper-level server;
   a network monitor to monitor a network connecting the upper-level server and the data transferor and to detect whether a fault occurs in the network; and
   a setter that includes a collection-data-setting storage, a collection-period-setting storage, a transfer-period-setting storage, a buffering-data-setting storage, and a buffering-period-setting storage, wherein
   in response to the network monitor not detecting the fault, the data collector collects the control data specified in the collection-data-setting storage with a first period specified in the collection-period-setting storage and stores the control data in the temporary memory, and the data transferor transfers the control data stored in the temporary memory to the upper-level server with a second period specified in the transfer-period-setting storage,
   in response the network monitor detecting the fault, the data collector collects the control data specified in the buffering-data-setting storage with a third period specified in the buffering-period-setting storage and stores the control data in the temporary memory, and the control data stored in the temporary memory is stored in the buffer memory with a fourth period specified in the buffering-period-setting storage, and
   the fourth period specified in the buffering-period-setting storage is automatically determined based on a maximum data storage speed of the buffer memory.

2. The data collection and transfer apparatus according to claim 1, wherein the control data specified in the buffering-data-setting storage is automatically controlled to be less than the control data specified in the collection-data-setting storage.

3. The data collection and transfer apparatus according to claim 1, wherein the third period specified in the buffering-period-setting storage is automatically controlled to be longer than the first period specified in the collection-period-setting storage.

4. The data collection and transfer apparatus according to claim 1, wherein an external device is connected to the data collection and transfer apparatus and the setter is capable of being arbitrarily set using the external device.

5. The data collection and transfer apparatus according to claim 4, wherein the external device determines, on a basis of the data storage speed of the buffer memory, whether the control data that is stored in the temporary memory and is specified in the buffering-data-setting storage is capable of being stored in the buffer memory with the fourth period specified in the buffering-period-setting storage.

\* \* \* \* \*